(12) United States Patent
Burnett et al.

(10) Patent No.: US 10,711,199 B2
(45) Date of Patent: Jul. 14, 2020

(54) PROCESSING APPARATUS

(71) Applicant: NOV Downhole Eurasia Limited, Gloucestershire (GB)

(72) Inventors: George Burnett, Aberdeen (GB); Mike Bradley, Chatham Maritime (GB); John Robinson, Nottingham (GB)

(73) Assignee: NOV DOWNHOLE EURASIA LIMITED, Stonehouse, Gloucestershire (GB)

( * ) Notice: Subject to any disclaimer, the term of this patent is extended or adjusted under 35 U.S.C. 154(b) by 0 days.

(21) Appl. No.: 16/093,412

(22) PCT Filed: Mar. 30, 2017

(86) PCT No.: PCT/GB2017/050898
§ 371 (c)(1),
(2) Date: Oct. 12, 2018

(87) PCT Pub. No.: WO2017/178793
PCT Pub. Date: Oct. 19, 2017

(65) Prior Publication Data
US 2019/0127645 A1 May 2, 2019

(30) Foreign Application Priority Data
Apr. 13, 2016 (GB) .................. 1606403.2

(51) Int. Cl.
*C10G 1/04* (2006.01)
*B01J 19/12* (2006.01)
(Continued)

(52) U.S. Cl.
CPC ............ *C10G 1/045* (2013.01); *B01J 19/126* (2013.01); *C10B 19/00* (2013.01); *C10B 53/06* (2013.01);
(Continued)

(58) Field of Classification Search
CPC .......... C10G 1/045; C10G 1/00; C10B 53/06; C10B 19/00; C10B 53/00; H05B 6/802;
(Continued)

(56) References Cited

U.S. PATENT DOCUMENTS

| 4,219,415 A | 8/1980 | Nassef et al. |
| 5,366,595 A | 11/1994 | Padgett et al. |
| 2013/0032464 A1* | 2/2013 | Kasin ................ C10K 3/02 201/19 |

FOREIGN PATENT DOCUMENTS

| CN | 105466197 A | 4/2016 |
| WO | 2006/083168 A1 | 8/2006 |

(Continued)

OTHER PUBLICATIONS

Search Report dated Sep. 22, 2016, for GB Application No. 1606403.2 (4 p.).

(Continued)

*Primary Examiner* — Prem C Singh
*Assistant Examiner* — Juan C Valencia
(74) *Attorney, Agent, or Firm* — Conley Rose, P.C.

(57) ABSTRACT

A processing apparatus includes a microwave processing chamber. In addition, the processing apparatus includes a rigid, rotatable feed wheel rotatable about an axis of rotation such that a part of the feed wheel is located within the processing chamber. Further, the processing apparatus includes a feed device configured to deposit materials to be processed onto the feed wheel. Still further, the processing apparatus includes an output into which processed materials from the feed wheel can be deposited.

14 Claims, 5 Drawing Sheets

(51) Int. Cl.
*H05B 6/80* (2006.01)
*C10B 19/00* (2006.01)
*C10B 53/06* (2006.01)
*H05B 6/78* (2006.01)

(52) U.S. Cl.
CPC .............. *H05B 6/78* (2013.01); *H05B 6/802* (2013.01); *H05B 6/806* (2013.01); *B01J 2219/0869* (2013.01); *B01J 2219/0879* (2013.01)

(58) Field of Classification Search
CPC .......... H05B 6/78; H05B 6/806; B01J 19/126; B01J 2219/0869; B01J 2219/0879; B09B 3/00
See application file for complete search history.

(56) References Cited

FOREIGN PATENT DOCUMENTS

| | | | |
|---|---|---|---|
| WO | WO 2006/083168 | * | 10/2006 |
| WO | 2008/028256 A1 | | 3/2008 |
| WO | 2008/059240 A2 | | 5/2008 |
| WO | 2013/110944 A1 | | 8/2013 |

OTHER PUBLICATIONS

PCT/GB2017/050898 International Search Report and Written Opinion dated Jul. 4, 2017 (13 p.).

* cited by examiner

PROCESSING APPARATUS

CROSS-REFERENCE TO RELATED APPLICATIONS

This application is a 35 U.S.C. § 371 national stage application of PCT/GB2017/050898 filed Mar. 30, 2017 and entitled "Processing Apparatus," which claims priority to GB Application No. 1606403.2 filed Apr. 13, 2016 and entitled "Processing Apparatus," each of which is hereby incorporated herein by reference in its entirety for all purposes.

STATEMENT REGARDING FEDERALLY SPONSORED RESEARCH OR DEVELOPMENT

Not applicable.

BACKGROUND

This invention relates to a processing apparatus, and in particular to a processing apparatus intended for use in the extraction of hydrocarbons from a matrix of solid materials such as rock chippings or the like.

WO2008/059240 describes an arrangement that can be used in the extraction of hydrocarbons from other materials. The arrangement comprises a conveyor belt onto which materials to be processed are loaded, the conveyor belt carrying the materials through a processing chamber in which microwaves are applied to the materials. The application of the microwaves results in the rapid heating of water carried with the materials, and in the thermal desorption of hydrocarbons from the materials. Whilst the microwave processing of the materials to extract hydrocarbons therefrom operates satisfactorily in tests, handling of the hydrocarbon containing materials in practise is difficult. It has been found that the materials tend to adhere to the material of the conveyor belt, and this can result in the materials adhered to the conveyor belt being repeatedly passed through the processing chamber. As a consequence, vitrification may occur. Furthermore, during the application of high power microwaves, it has been found that arcing often occurs, leading to damage to the conveyor belt. As a consequence, regular replacement of conveyor belts has been required.

Rather than use a belt conveyor to carry the materials through the processing chamber, a feed screw based arrangement has been developed, for example as described in WO2013/110944. However, whilst arcing in such arrangements is less of an issue as the processing chamber is substantially filled with materials to be processed, such arrangements also suffer from the disadvantage that materials being processed often adhere to parts of the feed screw arrangement with the result that their residence time within the processing chamber is undesirably long. Again, as a result, vitrification may occur. The vitrified materials can reach temperatures sufficiently high that parts of the feed screw arrangement or processing chamber, such as the ceramic components thereof, become damaged.

One of the issues that has been experienced is that, prior to treatment, the materials being processed are reasonably flowable, and after processing they take the form of a powder which can be transported, but during the processing operation the materials tend to become a very sticky conglomerate that is very difficult to handle.

It is an object of the invention to provide a processing apparatus in which at least some of the disadvantages associated with the known processing arrangements are overcome or are of reduced effect.

According to the present invention there is provided a processing apparatus comprising a microwave processing chamber, a rigid, rotatable feed wheel rotatable about an axis of rotation such that a part of the feed wheel is located within the processing chamber, a feed device operable to deposit materials to be processed onto the feed wheel, and an output into which processed materials from the feed wheel can be deposited, in use.

Preferably, a scraper mechanism is provided whereby, once processed materials from the feed wheel have been deposited into the output, materials adhered to the feed wheel can be scraped therefrom prior to the deposition of materials to be processed thereto from the feed device.

It will be appreciated that such an arrangement is advantageous in that the risk of materials passing repeatedly through the processing chamber is reduced. The likelihood of vitrification of the materials is thus reduced, and so the risk of damage arising through such vitrification is also reduced.

As the feed wheel is of rigid construction, its dimensions and the clearances between it and other parts of the processing apparatus can be selected in such a manner that arcing is avoided or reduced, and that microwaves are contained and focussed within the processing chamber.

The feed wheel is preferably shaped to define a channel. By way of example, the feed wheel may define a cylindrical hub and a pair of radially outwardly extending flanges or rims, the rims and hub together defining the channel. At least the hub of the feed wheel is conveniently formed from a microwave transparent material such as a suitable plastics and/or ceramic material.

The invention will further be described, by way of example, with reference to the accompanying drawings, in which.

Figure 1:
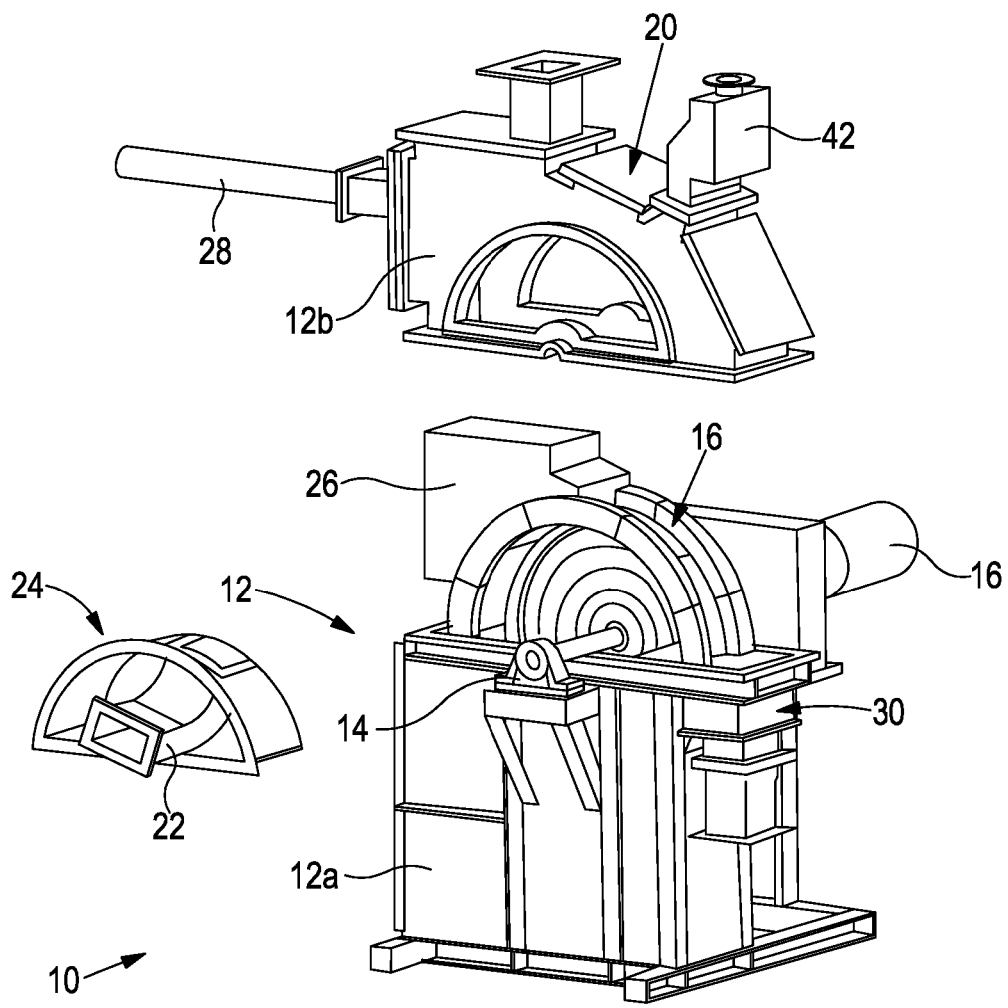
FIG. 1 is a partially exploded view illustrating a processing apparatus in accordance with an embodiment of the invention.

Referring to FIGS. 1 to 4 of the accompanying drawings, a processing apparatus 10 in accordance with one embodiment of the invention is illustrated. The processing apparatus 10 comprises a housing 12 of multipart form, including a lower part 12a and an upper part 12b. The lower part 12a carries bearings 14 whereby a rigid feed wheel 16 is supported for rotation about an axis of rotation defined by the bearings. It further carries a motor 18, for example of electrically powered form, operable to drive the feed wheel 16 for rotation, the motor 18 being controlled by a controller (not shown).

The upper part 12b defines a microwave processing chamber 20 to which microwaves are supplied, in use, via a waveguide 22 provided in a waveguide housing 24 secured to the housing 12 and located, in used, within the periphery of the feed wheel 16. Part of the periphery of the feed wheel 16 extends through the processing chamber 20 such that, over time as the feed wheel 16 is rotated, all of the periphery of the feed wheel 16 passes through the processing chamber 20.

Figure 4:
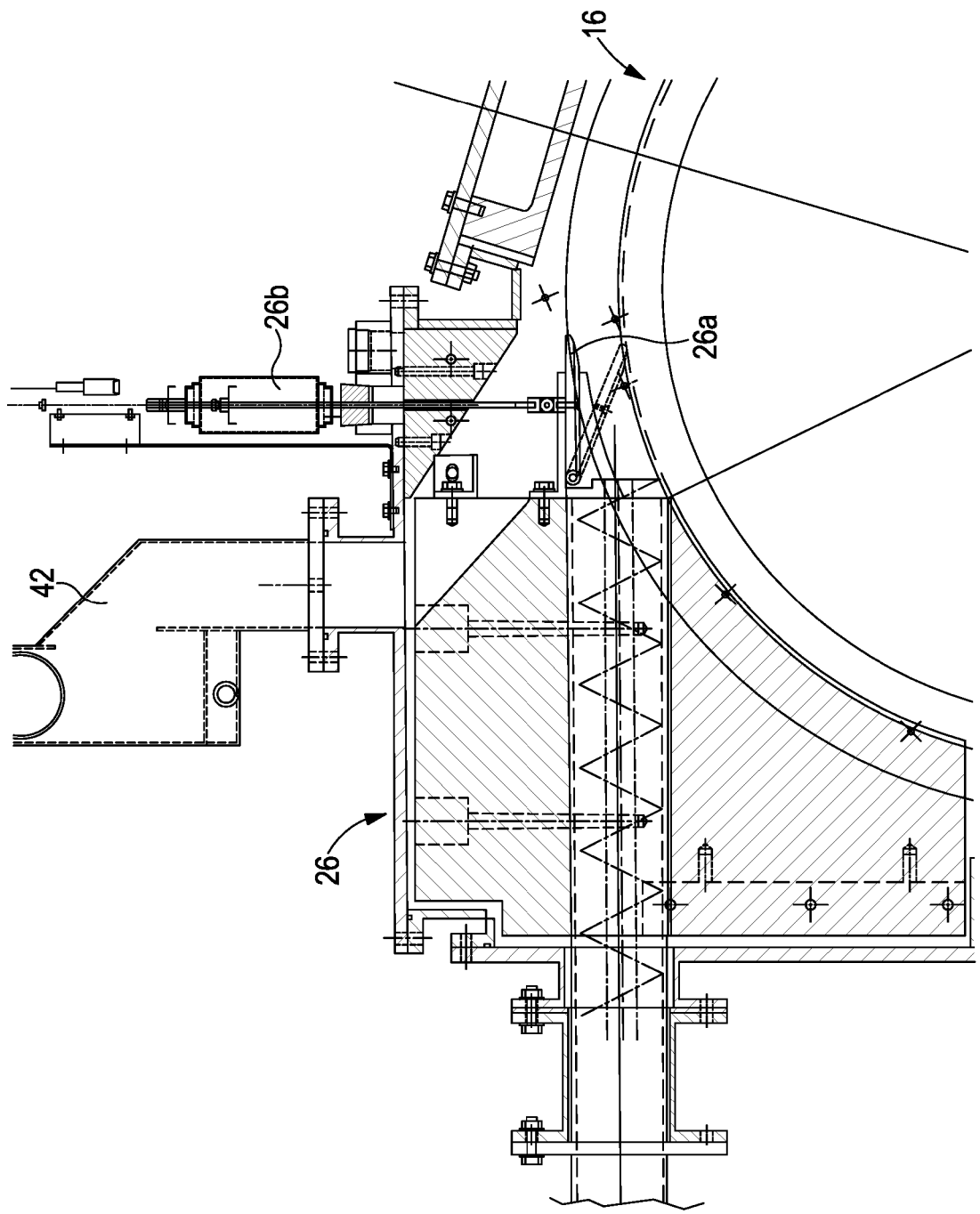
FIG. 4 is a view illustrating part of the apparatus.

A feed device 26 including a feed screw 28 is operable to deposit materials to be processed onto an upper part of the feed wheel 16, and an output 30 dimensioned to minimise the escape of microwave energy is arranged to allow the collection of processed materials from the feed wheel 16, the processed materials falling from the feed wheel 16 into the output 30 after they have passed through the processing chamber 20. As shown in FIG. 4, the feed device 26 conveniently includes a level sensor in the form of a pivotable flap 26*a* that rests upon the surface of the delivered material, and a sensor 26*b* such as an LVDT monitoring the position of the flap 26*a*. The level sensor thus provides information regarding the level of material deposited onto the wheel 16 at any given time.

Figure 2:
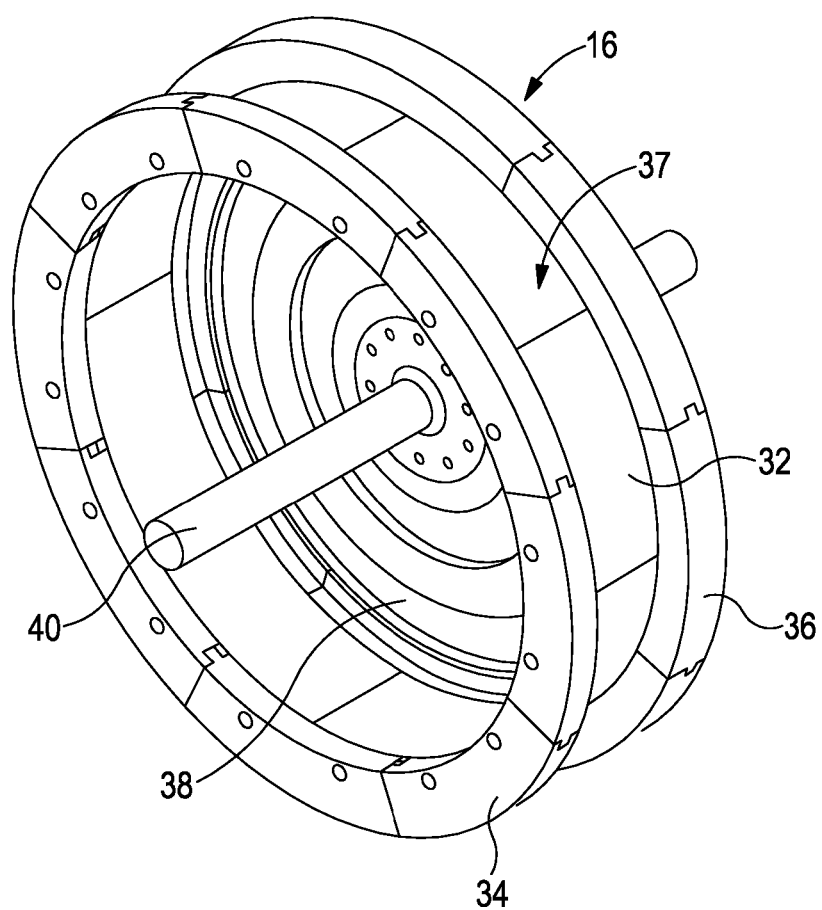
FIG. 2 is a view illustrating the feed wheel of the apparatus of FIG. 1.
Figure 3:
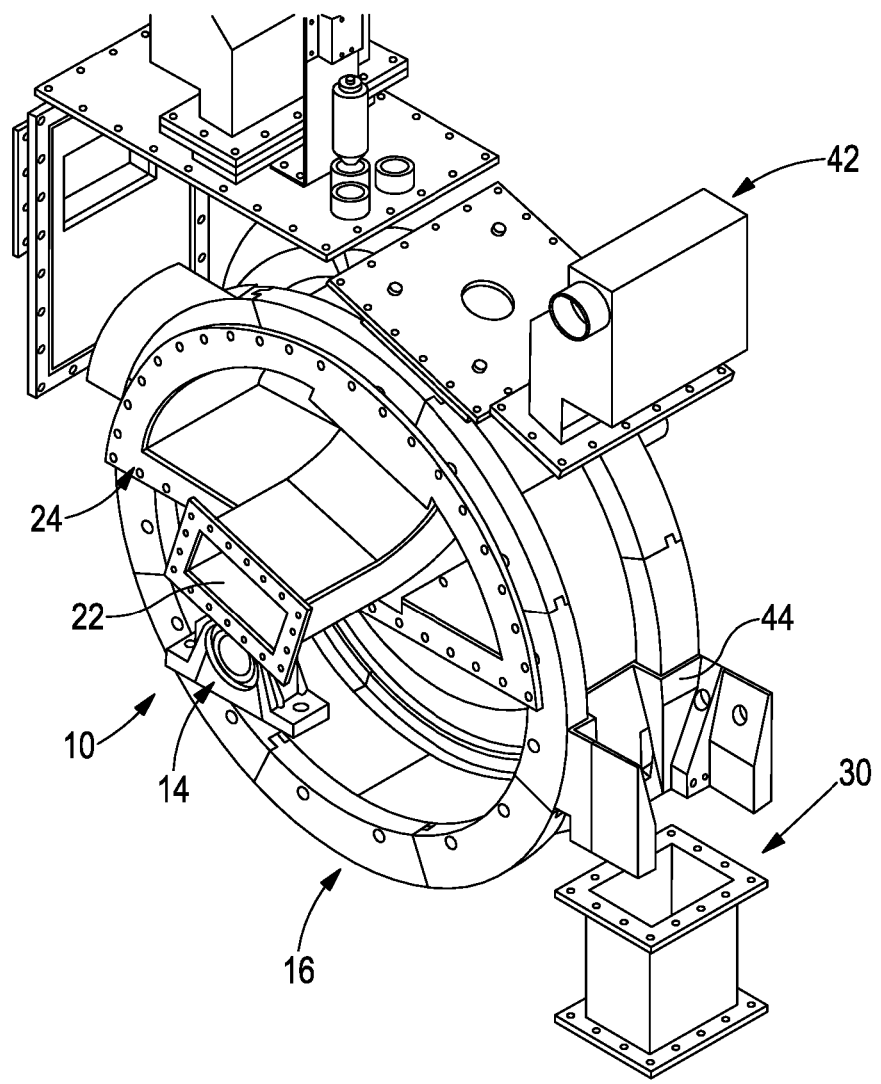
FIG. 3 is another view (with parts omitted for clarity) illustrating the apparatus of FIG. 1.

As shown in FIG. 2, the feed wheel 16 comprises a cylindrical hub 32 and a pair of rims 34, 36. The hub 32 and rims 34, 36 together define a channel 37 into which the materials to be processed are deposited by the feed device 26, in use, and from which processed materials fall into the output 30 after rotation of the feed wheel 16 to move the materials through the processing chamber 20. At one axial end, the hub 32 is closed by an end wall 38, and an axle 40 mounted to the end wall 38 is supported by the bearings 14 to support the feed wheel 16 for rotation.

The hub 32 of the feed wheel 16 is formed from a number of sections, each of which is of a material that is substantially transparent to microwaves, for example being formed from a suitable plastics and/or ceramic material. By way of example, the sections may each be of boron nitride, which is relatively easy to machine, although other harder materials may be used. The remainder of the feed wheel 16 may also be formed from a microwave transparent material, if desired. However, this is not of importance and, if desired, the said other parts may be of metallic materials or the like, so as to be of sufficient strength to allow the feed wheel 16 to bear the loads applied thereto, in use. Whilst illustrated as taking the form of a number of sections, the feed wheel 16 could potentially be of one piece construction, which may be advantageous in that microwave leakage, and/or leakage of materials between the sections, may be avoided.

As shown in FIG. 1, the upper part 12*b* of the housing 12 is provided with an outlet 42 whereby steam and hydrocarbons extracted during the processing operation and carried with the steam can be extracted from the apparatus 10.

In use, the motor 18 is operated to drive the feed wheel 16 for rotation, and the feed device 26 is operated to deliver or deposit materials to be processed onto the upper part of the feed wheel 16, into the channel 37 defined by the rims 34, 36 and the hub 32. Whilst delivered to an upper part of the feed wheel 16, as shown in FIG. 4 the point at which the feed device 26 outputs the materials to be processed onto the feed wheel 16 is conveniently lower than the uppermost part of the feed wheel 16 so that rotation of the feed wheel raises the materials before the materials are processed, enabling excess fluids to drain therefrom. The speed of rotation of the feed wheel 16 and rate of material delivery by the feed device 26 are conveniently selected such that the channel 37 is substantially completely filled with material to be processed, or that a desired, substantially uniform depth and/or profile of material is applied to the channel 37. The output of the level sensor may be used to control the operation of the motor 18 and/or the feed device 26 to ensure that the desired quantity of material is present upon the feed wheel 16.

It will be appreciated that the rotation of the feed wheel 16 conveys the materials located within the channel 37 thereof through the processing chamber 20 where the materials are processed through the application of microwaves thereto. The microwaves are supplied via the waveguide 22 to the underside of the hub 32, but the microwave transparent nature of the hub 32 allows the microwaves to pass through the hub 32 to interact with the materials carried thereby and located within the processing chamber 20. The application of the microwaves to the materials being processed rapidly heats the water content of the materials, and results in thermal desorption of any hydrocarbon content from the materials. The manner in which the hydrocarbon materials are extracted from the materials being processed is similar to that described in WO2008/059240 and so will not be described herein in further detail, save to note that after complete processing, the materials located within the channel 37 will be substantially free of hydrocarbons, the hydrocarbons being carried with the steam produced during the processing operation and extracted from the housing 12 by way of the outlet 42. The outlet 42 may be provided in a number of positions, FIGS. 1 and 4 illustrating two options for the location of the outlet 42.

The speed of rotation of the feed wheel 16 and applied microwave power are selected in such a manner as to ensure to substantially complete processing of the materials as they pass through the processing chamber 20 without over processing thereof.

The continued rotation of the feed wheel 16 results in the processed materials being conveyed to a position in which they are able to fall under the action of gravity from the feed wheel 16 to the output 30 from where they can be collected ready for transportation elsewhere.

Within the lower part 12*a* of the housing 12, adjacent the output 30, is located a scraper device 44. In some arrangements, the scraper 44 may contact the surfaces of the hub 32 and rims 34, 36 to scrape therefrom any materials that may have become adhered thereto. However, as boron nitride is relatively soft and so may be subject to wear, the scraper device 44 is preferably spaced slightly from the surfaces of the feed wheel 16 to minimise wear thereof which still permitting material adhered thereto to be dislodged. The dislodged materials are conveniently delivered to the output 30. It will be appreciated that in this manner, the repeated passage of materials through the processing chamber 20, and the associated risks of over processing and vitrification, is avoided.

The profile of the scraper device 44 conveniently follows that of the feed wheel 16 to minimise the quantity of material able to pass therebetween. It has been found that, in use, the quantity of steam produced during operation tends to aid cleaning of the feed wheel 16 and so, despite the presence of a small clearance, little if any material passes the scraper device 44.

It will be appreciated that the apparatus described hereinbefore is especially suitable for use in the continuous processing of materials. Accordingly, at any given time, the feed wheel 16 will be carrying unprocessed, materials that have just been delivered to the channel 37, partially processed materials that are being conveyed through the processing chamber 20, and fully processed materials that are about to be deposited into the output 30. A part of the feed wheel 16 will also be being cleaned by the scraper device, and another part of the feed wheel 16 will be about to have materials deposited thereto from the feed device 26.

As the feed wheel 16 is of rigid form, it will be appreciated that cleaning thereof is relatively straightforward. The dimensions of the feed wheel 16, housing 12 and waveguide housing 24, and the spacings therebetween, are chosen in such a manner that the risk of arcing is minimised, and that microwaves are contained within the housing 12, in use. In the arrangement illustrated, parts of the feed device 26 are shaped to minimise the clearance between the feed device 26 and the feed wheel 16, the feed device 26 serving as a choke. In conjunction with similar features of the output 30 and scraper device 44, microwave power is contained within the processing chamber 20. To counter the passage of microwaves around the outside edges of the rims 34, 36, a series of grooves are conveniently formed therein.

The processing apparatus 10 thus permits handling and processing of hydrocarbon containing materials such a rock chippings produced during the formation of boreholes in a relatively simple and convenient manner, avoiding over processing or repeated processing of the materials, in an apparatus that is self-cleaning and requires minimal maintenance during operation.

Whilst not illustrated, the processing apparatus 10 conveniently includes a connection to a source of nitrogen gas, and a valve operable to control the application of nitrogen gas to the processing chamber 20. In use, upon initial startup of the apparatus, the valve is preferably opened to supply nitrogen gas to the processing chamber 20 to dilute the atmosphere within the processing chamber 20 to reduce the oxygen content thereof, and thereby reduce the risk of combustion of the materials located within the processing chamber 20. Preferably, the supply of nitrogen gas reduces the oxygen content of the atmosphere within the processing chamber to less than approximately 7%. As the operation of the processing apparatus 10 proceeds, steam is generated within the processing chamber 20 which serves as an alternative dilutant, reducing the proportion of free oxygen present within the atmosphere within the processing chamber 20, and so the nitrogen supply can be correspondingly reduced, or terminated, by appropriate control over the valve.

Figure 5:
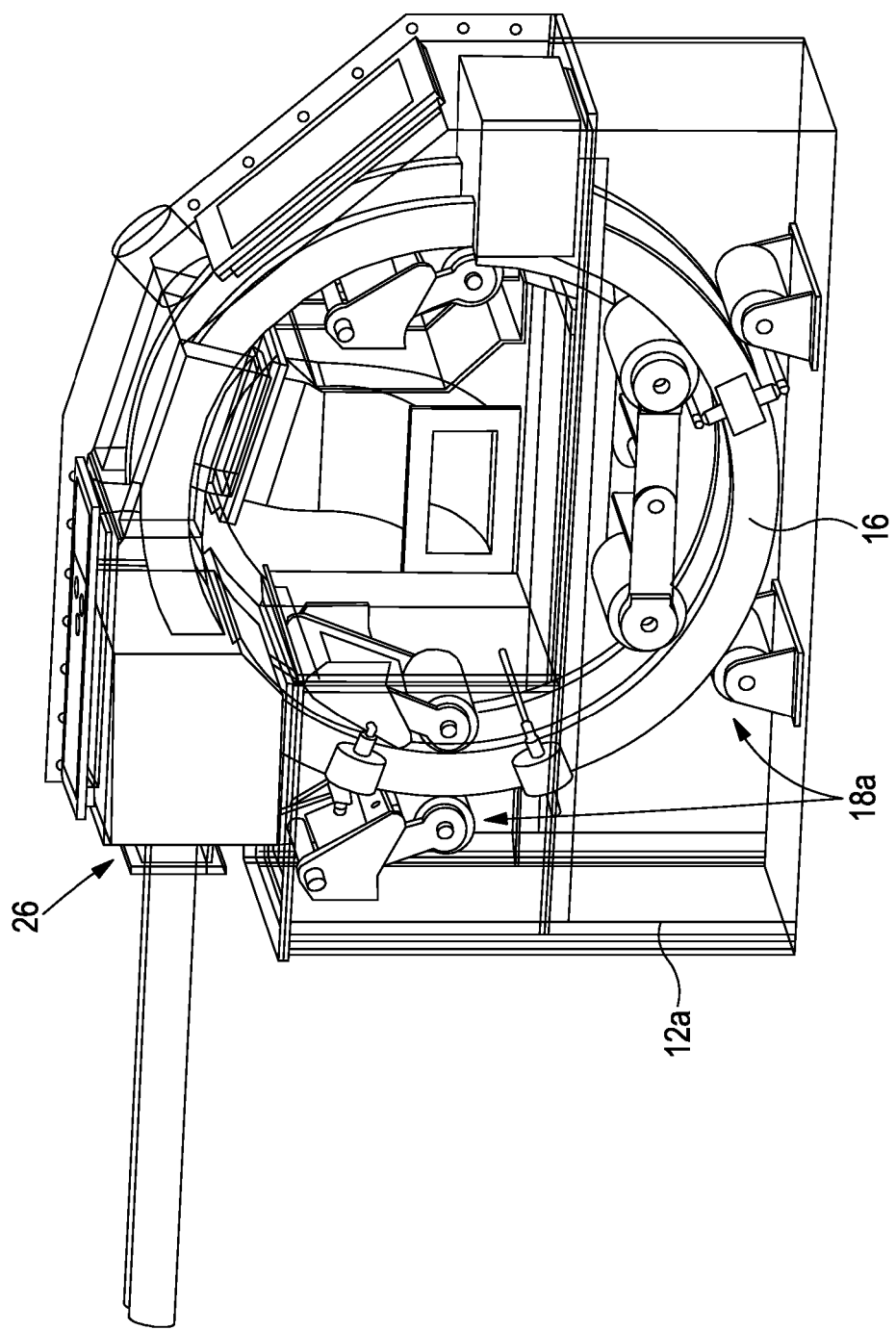
FIG. 5 is a view illustrating an alternative embodiment.

FIG. 5 illustrates an arrangement that is similar to that of FIGS. 1 to 4 but in which rather than use a motor 18 located and arranged so as to drive the feed wheel 16 for rotation about its axis, a friction drive arrangement 18a is provided within the lower part 12a of the housing 12 and arranged to cooperate with the surfaces of the feed wheel 16 to support the wheel 16 for rotation and to transmit drive thereto.

Whilst one embodiment of the invention is described herein and illustrated in the accompanying drawings, it will be appreciated that a wide range of modifications and alterations may be made to the processing apparatus without departing from the scope of the invention as defined by the appended claims.

The invention claimed is:

1. A processing apparatus, comprising:
    a microwave processing chamber;
    a rigid, vertically oriented rotatable feed wheel having a horizontally oriented axis of rotation, wherein a part of the feed wheel is located within the processing chamber;
    a feed device configured to deposit materials to be processed onto a radially outer surface of the feed wheel; and
    an output configured to receive processed materials that fail from the radially outer surface of the feed wheel after the processed materials have passed through the processing chamber.

2. An apparatus according to claim 1, wherein a scraper is provided whereby, once processed materials from the feed wheel have been deposited into the output, materials adhered to the feed wheel can be scraped therefrom prior to the deposition of materials to be processed thereto from the feed device.

3. An apparatus according to claim 1, wherein the dimensions of the feed wheel and the housing, and the clearances therebetween, are selected to avoid arcing and to contain microwaves within the apparatus.

4. An apparatus according to claim 1, wherein the radially outer surface of the feed wheel comprises a channel, wherein the feed device is configured to deposit the materials to be processes into the channel.

5. An apparatus according to claim 4, wherein the feed wheel comprises a cylindrical hub and a pair of radially outwardly extending rims, the rims and hub together defining the channel.

6. An apparatus according to claim 5 wherein at least the hub of the feed wheel is formed from a microwave transparent material.

7. An apparatus according to claim 1, further comprising a motor operable to drive the feed wheel for rotation.

8. An apparatus according to claim 7, wherein the motor is configured to provide a speed of rotation of the feed wheel which is selected to ensure complete processing of materials within the processing chamber.

9. An apparatus according to claim 8, wherein the feed device is configured to have a speed of operation which is relative to the speed of rotation of the feed wheel to ensure that a desired quantity of material is present upon the feed wheel.

10. An apparatus according to claim 9, wherein the feed device comprises a level sensor, wherein the level sensor is used to control the operation of the motor, the feed device, or the motor and the feed device to ensure a desired quantity of material is present upon the feed wheel.

11. An apparatus according to claim 1, further comprising a waveguide extending into an inner periphery of the feed wheel and configured to direct microwaves radially outward through the feed wheel and the materials to be processed disposed on the radially outer surface of the feed wheel.

12. An apparatus according to claim 11, wherein the microwaves are configured to heat water in the materials to be processed to remove the water and hydrocarbons from the material to be processed and produce the processed materials.

13. An apparatus according to claim 1, wherein as the feed wheel is rotating about the horizontal axis of rotation, the radially outer surface of the feed wheel includes a first portion rotating upward and a second portion rotating downward, wherein the feed device is configured to deposit the materials to be processed onto the first portion fo the radially outer surface of the feed wheel and the output is configured to receive the processed materials that fall from the second portion fo the radially outer surface of the feed wheel.

14. An apparatus according to claim 1, further comprising a scraper positioned radially outward of the radially outer surface of the feed wheel, wherein the scraper is configured to dislodge processed materials from the radially outer surface of the feed wheel after exiting the microwave chamber and direct the processed materials into the output.

* * * * *